United States Patent [19]

Kuhn

[11] 4,215,269
[45] Jul. 29, 1980

[54] FIBER OPTIC MODEM/DATA SET

[76] Inventor: Loughrey R. Kuhn, 950 Norwood Rd., Silver Spring, Md. 20904

[21] Appl. No.: 914,134

[22] Filed: Jun. 9, 1978

[51] Int. Cl.$^2$ .......................................... H04B 9/00
[52] U.S. Cl. ...................... 455/612; 307/352
[58] Field of Search ............... 250/199; 307/350, 352

[56] References Cited

U.S. PATENT DOCUMENTS

| 3,786,284 | 1/1974 | Engstrom | 307/350 |
| 4,012,633 | 3/1977 | Huntley | 250/199 |
| 4,037,162 | 7/1977 | Bumgardner | 307/352 |
| 4,051,363 | 9/1977 | Fish | 250/199 |
| 4,052,611 | 10/1977 | Fish | 250/199 |
| 4,121,095 | 10/1978 | Endersz | 250/199 |

*Primary Examiner*—Howard W. Britton

[57] ABSTRACT

The specification discloses a transmitter and receiver set which operates so as to: pick up digital information as electrical impulses, such as information produced by a computer; translate this information into square-wave optical signals, which may be carried along optical fiber; amplify the electronic signal, as well as impress on the electronic signal an oscillation which is characteristic of the data signal alone; detect the said oscillations; and translate this detected signal into the standard electronic signal output.

1 Claim, 5 Drawing Figures

BLOCK DIAGRAM OF FIBER OPTIC MODEM/DATA SET

SCHEMATIC DIAGRAM OF TRANSMITTER CIRCUIT

SCHEMATIC DIAGRAM OF RECEIVER CIRCUIT

WAVE SHAPES

PHASE LOCK CIRCUIT CHARATERISTIC OUTPUT

FIBER OPTIC MODEM/DATA SET

BACKGROUND

This invention relates to demodulation of a known optical signal, and more particularly relates to a simple and inexpensive demodulation of a digital optical signal whose characteristic of perceptible, yet distinctly consistent, square-signal shape deterioration (dispersion) is indicative of transmission in an optical fiber.

In the past, simple threshold detection has accomplished signal discrimination with the advantage of low cost, but with several disadvantages, including:

(1) the fact that short and medium lengths of fiber cause a dramatic change in the signal amplitude requiring large adjustment of the threshold amplitude level of the threshold detectors. Some manufacturers have taken to selling a standard length of fiber optic cable for a transmitter receiver pari with a set threshold, regardless of the length the customer might want at the time or at a later time. Imposing additional fiber length restrictions on the customer often destroys the cost advantage of the simple threshold detector approach.

(2) increased error rate when used with long lengths of fiber, (3) incapability of discriminating between "noise", that is, spurious signals, having sufficient amplitude to turn the threshold detector on, and appropriate signals.

In addition to simple threshold detection, "sequenced voting devices" have been used. In this approach, a digital signal is broken up into a number of slices, 16 for example, which are each "voted on" by single level or multilevel threshold detectors. If a certain number of threshold detectors affirm the presence of a digital signal, then a fixed digital signal is regenerated. The disadvantage of the sequenced voting devices has been their expense, and they are highly data-speed sensitive.

It is noted that the Harris Corporation is currently marketing a Model 4359, "fiber optics digital data link," and that Valtec Corporation is currently marketing a "fiberoptic duplex data link—long distance, model RSK-D1" and a "fiberoptic duplex data link—moderate distance, model RSH-D1".

DETAILED DESCRIPTION OF THE PREFERRED EMBODIMENT

It is the object of the present invention to provide a simple, inexpensive, yet effective optical signal demodulator which discriminates the digital signal from other signals, such as line-induced optical noise from nuclear blasts or lower level nearby sources; electrical transmitter noise; detector dark-current noise; detector-thermal noise; and even noise analogue coding on the same optical line. The invention arises from the realization that a fiber optic transmission medium creates a consistently predictable ramp slope to the leading edge (as well as the following edge) of a binary (digital) signal. This slope can be manipulated to an amplitude overshoot which then causes an oscillation at a characteristic frequency. (Analogue signals also have predictably shifted slopes which can be corrected to their estimated original form, using the technique described herein or other corrective techniques.)

Even with the existence of fiber optic communications, the prior art has not utilized the highly stable signal producing a consistent ramp slope where rise time can be very accurately selected—over a narrow or wide range by a phase-locking circuit which locks on a purposefully induced over-shoot oscillation.

Previous utilization of phase locking circuitry has been to discriminate different frequencies in frequency-modulated codes. The prior art of phase-locking circuitry can best be described by example. Input value A is coded as frequency 1; input value B is coded as frequency 2; input value C is coded frequency 3, etc. The phase-lock circuit has been used to differentiate at the receiver output different frequencies which were impressed on the signal carrier at the transmitter.

In the case of the present invention the frequencies are impressed on the signal at the receiver—just after the signal is detected. Then the phase-lock circuit selects only the frequency (plus or minus the desired determinable frequency range), correctly corresponding to a near instantaneous rise at the transmitter input to the optical fiber. Additionally, the output of a typical phase-locking circuit is fixed, and therefore readily followed by a threshold detector, functioning here in a manner quite different from its usual manner.

In the present invention, the threshold detector essentially performs the task of cleaning up the phase-locking cirucit-induced characteristics, in the manner described below.

Additional objects, advantages and characteristic features of the present invention will become apparent from the following detailed description of a preferred embodiment of the invention when considered in conjunction with the accompanying drawings.

Figure 1:
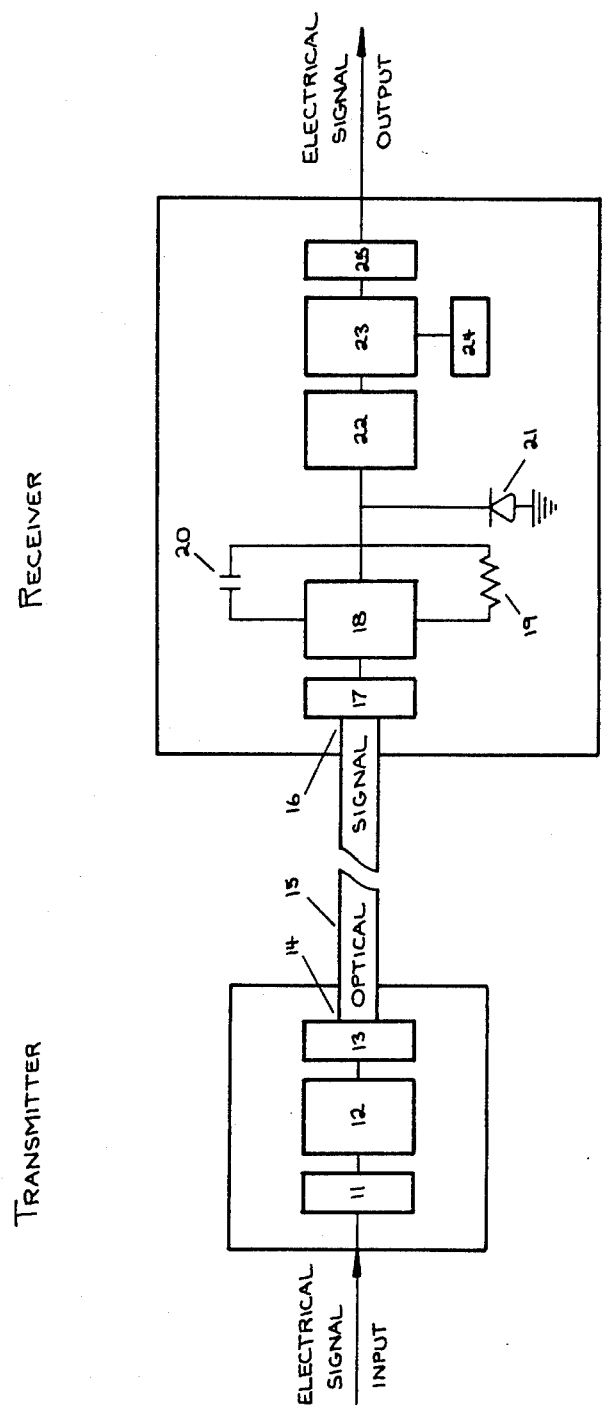
Figure 2:
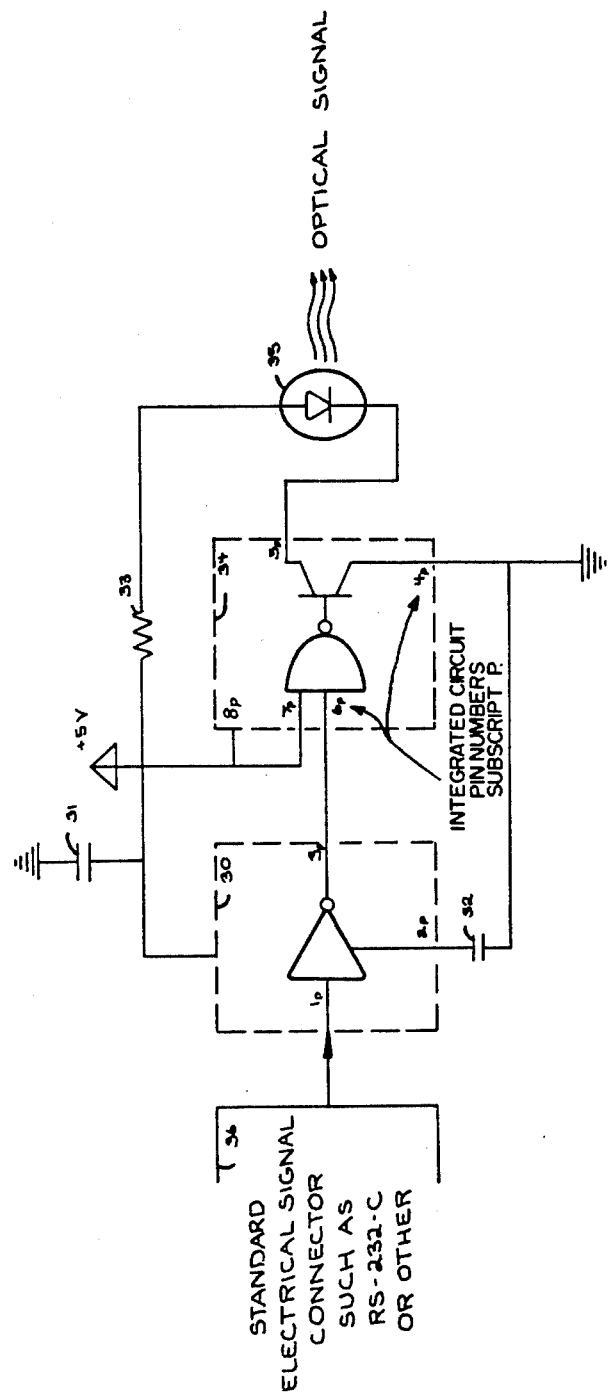
Figure 3:
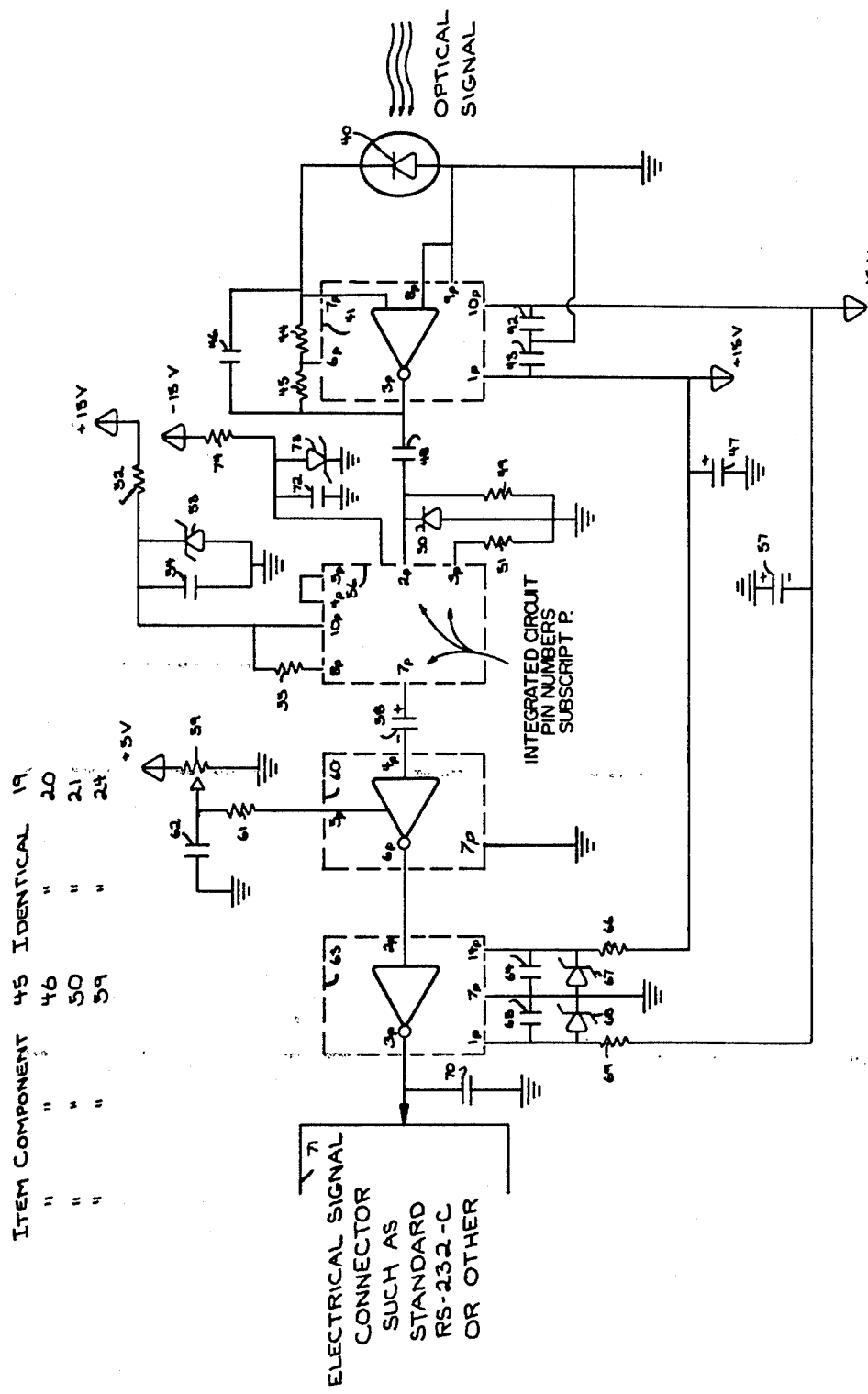
Figure 4:
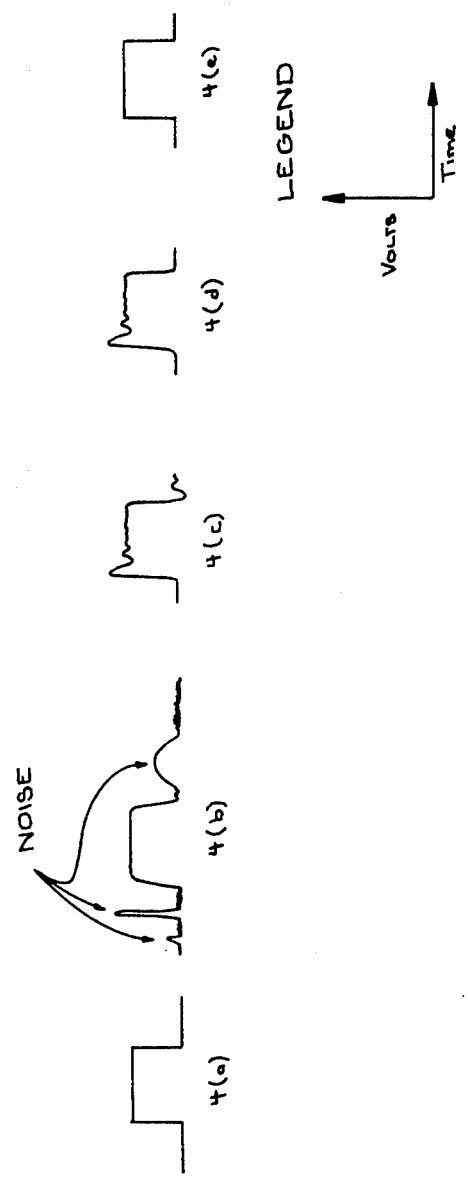
Figure 5:
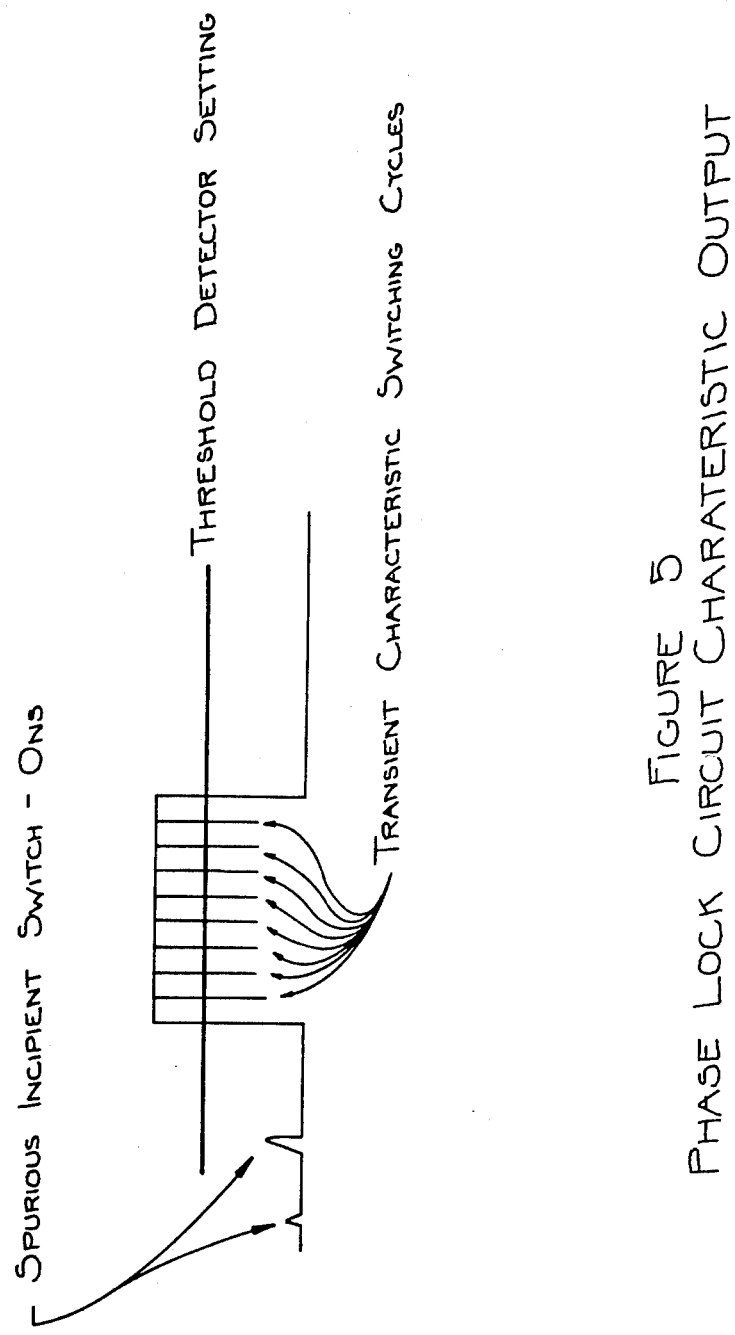

FIG. 1 is a block diagram of the data set.
FIG. 2 is a schematic of the transmitter circuit.
FIG. 3 is a schematic of the receiver circuit.
FIGS. 4a–4e are wave shapes.
FIG. 5 is a phase-lock circuit characteristic output.

In FIG. 1, (11) is the transmitter input signal interface; (12) is the light source driver circuit; (13) is the light source, e.g., pulsed CW laser or light emitting diode; (14) is the light source/fiber interface; (15) is the optical fiber(s) ; (16) is the fiber(s)/light detector interface; and (17) is the light detector, such as p.i.n. photodetector, photo-transistor, avalanche photo-diode, avalanche reach-through photo-diode, photo-multiplier tube; (18) is the operational amplifier; (19) is the operational amplifier feedback resistor; (20) is the operational amplifier capacitor; (21) is the germanium diode; (22) is the phase-locking circuit; (23) is the threshold detecto (24) is the potentiometer; and (25) is the receiver output signal interface.

The transmitter as depicted in FIG. 1 has a transmitter input signal interface (11), such as an RS-232C voltage signal (or any other standard binary signal) to transistor-transistor logic (TTL) levels, or current loop signals to TTL levels (or to emitter coupled logic (ECL, etc.). The TTL level signal operates a fast light source driver (12). The light source (13) is turned on at a speed depending greatly on the quality of the light source. A typical low cost LED will turn on at a 20 megahertz rate or 50 nanoseconds from 10% brightness to 90% brightness. The light is transmitted through the light source/fiber interface (14), into the optical fiber(s) (15), through the fiber/light detector interface (16), into the light detector (17). By the time it has reached the operational amplifier, the signal has passed through sections 11 thru 17, deteriorating all along the way.

The objective of the usual receiver electronics is to reproduce the original binary signal (See FIG. 4(a)) in the following way:

(1) detect the optical signal;

(2) amplify this signal faithfully to a level of strength for signal processing;

(3) process the signal to proper shape (squareness, as the final output is binary (on/off));

(4) Eliminate spurious signals with improper length or strength by setting a threshold detector; and (5) interface the resulting processed signal to RS-232C voltage standards (any fixed voltage between +3 and +20 Volts for one polarity, e.g. +8 Volts, and any fixed voltage between −3 and −20 Volts for the other polarity, e.g. −8 Volts).

This invention does not faithfully amplify the detected signal. Rather, by adjusting the operational amplifier capacitance (20) (response speed) very slightly, in the order of a few pico-Farads, an overshoot can be induced at the leading corner of the relatively well-known incoming signal shape depicted in FIG. 4(c). Spurious incoming signals will not cause the same overshoot shape.

This overshoot looks like a sine wave with fixed frequency (or phase). The next component is a "phase (frequency) lock" circuit (21). This circuit is set to lock onto or respond or switch on at this sine shape's frequency. That is, the shape depicted in FIG. 4(c) is converted to the shape depicted in FIG. 4(d) by the use of a germanium diode (21), which prevents a voltage from going below zero, in this case. The phase lock circuit then turns on, i.e., goes to a shape closely resembling the final desired shape depicted in FIG. 4(e). Since the phase lock circuit is of a delicate sort, the resulting output from this circuit may not be quite so clean, but instead have incipient switch-ons and switch-offs. Also, there are the transient characteristic switching cycles. The actual output may look like the wave shape depicted in FIG. 5.

These phase lock circuit aberrations are cleaned up by setting the potentiometer (24) of a threshold detector (23) about half-way up the proper signal. The threshold detector does not detect the spurious incipient switch-ons, because they are not above the threshold. As for the transient characteristic switching cycles, the threshold detector has its own innate capacitance which does not detect very, very short on-off switches in the signal, even though the switches are of sufficient magnitude above the magnitude threshold. The result is the final desired shape depicted in FIG. 4(e). That is, FIG. 4(e) shows what the computer's noise discriminator circuit is looking for. Thus, the present invention achieves a very low final or operational "bit error rate", for a typical optical fiber signal shape, and does this inexpensively.

| Production Component Items Specification for FIGS. 2 and 3 | | | |
|---|---|---|---|
| Component Item Number | Number Required per P.C. Board | Part Number | Part Description, Manufacturer and Second Source Manufacturer |
| (63) | 1 | | RS232-C Line Driver |
| | | MC1488L or | I.C. - Motorola |
| | | LM1488J | I.C. - National Semiconductor |
| (60)&(30) Combined | 1 | | RS232-C Line Receiver** |
| | | MC1489L or | I.C. - Motorola |
| | | LM1489J | I.C. - National Semiconductor |
| (67),(68) | 2 | | Zener Diodes |
| | | 1N4739A or | Motorola |
| | | 1N4739A | International Rectifier |
| (53),(73) | 2 | | Zener Diodes |
| | | 1N4742A or | Motorola |
| | | 1N4742A | International Rectifier |
| (56) | 1 | | Phase Lock Loop |
| | | NE565A or | I.C. - Signetics |
| | | LM565CN | I.C. - National Semiconductor |
| (35) | 1 | | Optical Source |
| | | HEMT-3300 or | L.E.D. - Hewlett-Packard* |
| | | FLV 104 | L.E.D. - Fairchild (needs 12 Ohm, ¼ Watt, 1% resistor instead of 30 Ohm) |
| (40)&(41)&(44) Combined | 1 | | Optical Detector/Operational Amplifier with Internal Feedback Resistor |
| | | 529-2-5 | Devar Inc. |
| (34) | 1 | | Source Driver |
| | | SN75451BP or | I.C. - Texas Instruments |
| | | DS75451J-8 | I.C. - National Semiconductor |
| (31),(47),(48), (57),(58) | 5 | | Tantalum Capacitor ±10%, 22* microfarad (Optional Range: 22 to 33 microfarad, 15 to 20 to 35 Volt) |
| | | 198D226x0015K1 or | Sprague |
| | | MMS-015-226A Case S | Corning |
| (50) | 1 | | Germanium Diode |
| | | 1N34 | Several manufacturers |
| (45) | 1 | | Metal Film High Stability Precision Resistor, ±1%, 5.5 MOhm, ¼ Watt (Optional Range: 500 K to 6 Mohm) |
| | | MEB | TRW (International Rectifier Corporation) International Telephone and Telegraph |
| (52),(66) (69),(74) | 4 | | Metal Film or Carbon Resistors, ±10%, 270 Ohm, ¼ Watt Allen-Bradley |

-continued

Production Component Items Specification for FIGS. 2 and 3

| Component Item Number | Number Required per P.C. Board | Part Number | Part Description, Manufacturer and Second Source Manufacturer |
|---|---|---|---|
| (36)&(71) Combined | 1 | | RS232 Connector, 180° Type, Selective Gold over Nickle Finish, Post Length: .425 Inches, Post Size: .025 Inches Square |
| | | 205738-3 or | AMP |
| | | 205738-7 | AMP |
| | | | Cinch |
| | 1 | | Power Cord, Three Wire, 6 Foot Length, .253 Inch Outside Diameter |
| | | | Belden |
| | 1 | | Miniture Toggle Switch |
| | | MTA 106DPC or | ALCO |
| | | MPC 121 | JBT |
| | 1 | | Light Emitting Diode Indicator |
| | | 550-0405 | Dialco |
| (59) | 1 | | 5 KOhm Potentiometer, Multi-turn Cermet Type |
| | | 3805P or | AMPHENOL$^R$ |
| | | 3069P or | Bourns |
| | | 43P | Spectrol |
| | 1 | | Detector Bushing |
| | | 530524-1 | AMP |
| | 1 | | Source Holder |
| | | 530563-1 | AMP |
| (46) | 1 | | Small capacitor, few picofarads Adjusted to suit requirements |
| (54),(64), (65),(72) | 4 | | Tantalum Capacitors ±10%, 25 Volt, 5.6* microfarad (Optional Range: 5.6 to 10 microfarad, 15 to 20 to 25 Volt) |
| | | 198D106x0025K1 or | Sprague |
| | | MMS-025-106A Case S | Corning |
| (62),(42),(43) | 3 | | Ceramic Capacitors-Disk Type 0.2 microfarad (Optional Range: 20 to 50 Volt) |
| | | | Sprague |
| | | UK25-204 or | Centralab |
| | | 4MCG-C-224M | ARCO |
| | 1 | | Ceramic Capacitor - Disk Type 0.0047 microfarad (Optional Range: 20 to 1000 Volt) |
| | | | Sprague |
| | | CCD-472 | ARCO |
| (32),(70) | 2 | | Ceramic Capacitors-Disk Type 330 picofarad (Optional Range: 20 to 1000 Volt) |
| | | | Sprague |
| | | CCD-331 | ARCO |
| (55) | 1 | | Metal Film or Carbon Resistors, ±10%, 82 KOhm, ¼ Watt Allen-Bradley |
| (61) | 1 | | Resistor, ±10%, 5.6 KOhm, ¼ Watt Allen-Bradley |
| (49),(51) | 2 | | Resistors, ±10%, 2.7KOhm, ¼ Watt Allen-Bradley |
| (33) | 1 | | Metal Film Precision Resistor, ±1%, 30 Ohms for Hewlett-Packard HEMT-3300, ¼ Watt (Optional Range: 30 to 33 Volt) |
| | | C5 or | Corning |
| | | MFS-¼ or | Dale |
| | | MEB | TRW (International Rectifier Corporation |

Note:
* = preferred,
P.C. Board = printed circuit board,
I.C. = integrated circuit,
L.E.D. = light emitting diode,
** = Line Receiver integrated circuit contains also a threshold detector section, used herein as component item number (60).

IMPROVEMENTS AND ALTERNATIVES (1) Utilization of the leading and following edges of phase oscillation, matching two phases in a balanced circuit.

(2) Utilization of the leading-edge and following-edge oscillation, establishing time separation compared to known signals' leading-edge and following-edge separation.

(3) Alternative of impressing particular slope ramp and/or oscillation at light source driver circuit (12) at transmitter end.

(4) Utilization of leading-edge to frequency-discriminate different channels, which are binary, into serial information stream, by impressing different ramps at the transmitter source drive circuit (12), for example: channel 1=ramp slope 1, channel 2=ramp slope 2, . . . , channel n=ramp slope n. These different slopes could then be differentiated in the same way as in the present embodiment (n pre-set phase lock circuits in series), or by having one phase lock circuit with n different sequenced frequency lock settings, sequenced by an automatic system.

(5) Same as alternative directly above, that is (4), except different channels do not all have to be binary. Some or all signal channels can be analogue.

(6) The frequency selecting circuit is set in the existing embodiment for a range of slope ramps that allow a range of predictable slopes that allow a range of predictable slope ramps corresponding to a distance range of x meters of a specific fiber optic cable to y meters. If the distance is known before hand at $x_1$ to $y_2$, then the section frequency can be much narrower, or wider as the case may be. Or, after the implementation at a particular site, an automatic system can select the very narrow frequency from the slope ramp oscillation corresponding to the length and type of optical fiber(s) actually used and known.

(7) A variation in the feedback resistor will effect overshoot of the amplifier in the same way as the small Farad capacitor (20) induces overshoot when it (20) is varied.

(8) Utilization of other methods of slope ramp section.

Although the present invention has been shown and described with reference to a particular embodiment, nevertheless, various changes and modifications which are obvious to a person skilled in the art to which the invention pertains are deemed to lie within the spirit, scope and contemplation of the invention.

What is claimed is:

1. A data set fo translating signals from standard electronic digital computer signal to a signal suitable for transmission on an optic fiber and translating said optical signal to a standard electronic signal comprising in combination:

(a) means to detect and translate said computer signal into a square wave optic signal, which optic signal is transmitted by and degraded in an optic fiber, yielding a degraded square wave optic signal, (b) means to detect and translate said degraded square wave optic signal to an electronic signal, (c) means to amplify said electronic signal including means to impress on the initial portion of said signal an oscillation characteristic of the signal itself at the point said signal ceases to rise, (d) means to detect said imposed oscillations which are characteristic of the data signal alone, (e) means to translate said detected signal into the standard electronic signal output.

* * * * *